Figure 1:
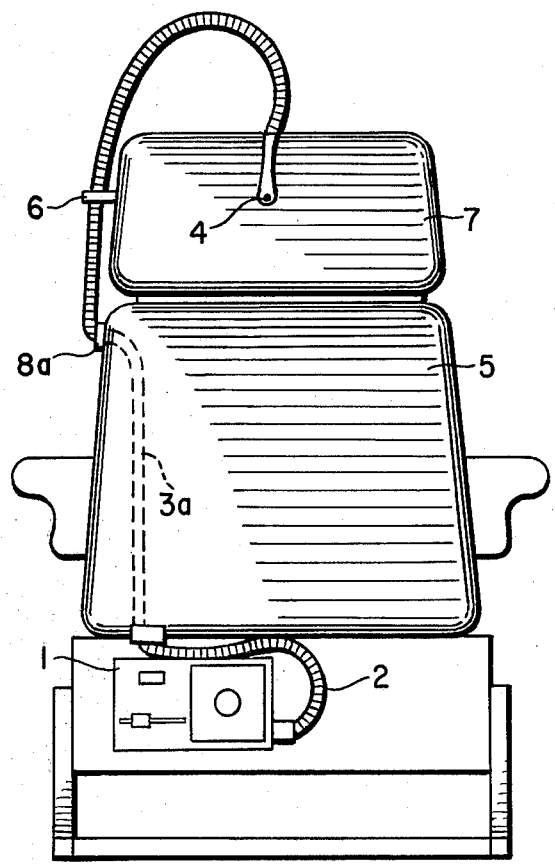

United States Patent [19]

Scheer et al.

[11] 4,233,649
[45] Nov. 11, 1980

[54] TREATMENT CHAIR WITH COOL-LIGHT LAMP FOR DENTAL MEDICINAL PURPOSES

[76] Inventors: Peter Scheer, Wandsbeker Markststr. 91, 2000 Hamburg 70; Arnold Hamann, 2061 Ahrensfelde4, Westerau-Ahrensfelde, both of Fed. Rep. of Germany

[21] Appl. No.: 891,811

[22] Filed: Mar. 30, 1978

[30] Foreign Application Priority Data

Sep. 27, 1977 [DE]  Fed. Rep. of Germany ....... 7736502

[51] Int. Cl.² ................................................ F21V 7/04
[52] U.S. Cl. ..................................... 362/32; 362/131; 362/430; 362/431

[58] Field of Search ................... 362/33, 131, 32, 430, 362/431

[56] References Cited

U.S. PATENT DOCUMENTS

| 3,923,372 | 12/1975 | Roland | 362/32 X |
| 4,009,382 | 2/1977 | Nath | 362/32 |

*Primary Examiner*—Stephen J. Lechert, Jr.
*Attorney, Agent, or Firm*—Toren, McGeady and Stanger

[57] ABSTRACT

The innovation relates to a treatment chair with cool-light lamp for dental-medicinal purposes, wherein the light is conducted between the point where the light emerges and the remotely arranged light source through a glass fiber bundle which is arranged in a partially flexible tubular guide.

5 Claims, 2 Drawing Figures

TREATMENT CHAIR WITH COOL-LIGHT LAMP FOR DENTAL MEDICINAL PURPOSES

Such cool-light lamps that have heretofore become known have the disadvantage that when the position of the patient is changed, i.e. when the treatment chair is adjusted, the lamp must be readjusted accordingly in order to prevent blinding and hindering of physician and patient during the treatment due to the tubular guide.

Pursuant to the utility model the aforementioned disadvantages are avoided by an integrated mounting of the tubular guide in the back rest and/or head rest of the treatment chair. When this tubular guide is rigidly connected to the back rest of the treatment chair or, in the case of a relatively movable head rest, when the guide is rigidly connected to the latter, the cool-light lamp always remains in the previously adjusted optimum position. The treating physician can continue to work even after adjustment of the treatment chair without having to release the tool from his hand and without being hindered by his own shadow or being limited because of the lamp.

The tubular guide of the cool-light lamp preferably runs at least partially within the back rest and/or the head rest so that it is substantially prevented that the treating physician is caught on the tubular guide. In the latter case, the actual light source and its control elements are preferably arranged in or at the base of the treatment chair.

Further details and features of the innovation result from the following description and the attached drawings in which an embodiment of the cool-light lamp pursuant to the utility model is illustrated in an exemplified manner.

Figure 2:
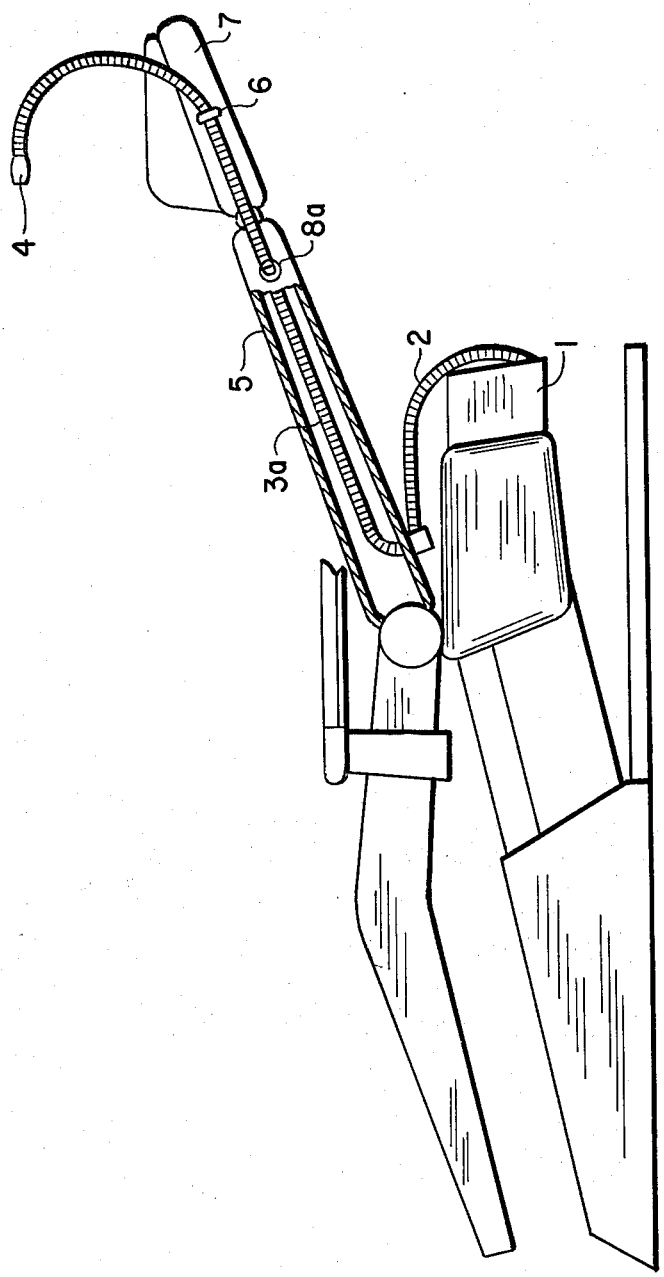

In the drawings:

FIG. 1 shows the back side of a treatment chair with a cool-light lamp pursuant to the utility model according to a first embodiment, FIG. 2 shows a side view of FIG. 1, with the treatment chair folded down.

As FIGS. 1 and 2 show, the switch box 1 with the power supply unit, light source and control element can be mounted at any desired point of the treatment chair. The light of a low-voltage halogen lamp collected in a reflector is conducted from the switch box 1 through a flexible glass fiber bundle within a partially flexible tubular guide 3a to the point 4 where the light emerges and, thus, to the mouth of the patient. A portion of the tubular guide 3a is arranged within the back rest 5 and/or the head rest 7. According to an embodiment of the innovation, this guide emerges at the holder 8a, just below the headrest 7, and extends subsequently in the above-described manner to the holder 6 and the point 4 where the light emerges. As a result, each time the position of the head rest is changed, the position of the point 4 where the light emerges from the glass fiber bundle does not change relative to the mouth of the patient.

We claim

1. Lamp assembly for dental-medical and similar purposes including a treatment chair having a first part and a second part movably displaceable relative to said first part, a light source, an elongated flexible glass fiber bundle having a first end and a second end with the first end connected to said light source for transmitting light through said glass fiber bundle, a flexible tubular guide enclosing at least a part of said glass glass fiber bundle between the ends thereof, a light outlet member connected to the second end of said glass fiber bundle for directing the light therefrom, wherein the improvement comprises that said light source is mounted on said treatment chair, said flexible tubular member extending from the second end of said glass fiber bundle, a holder mounted on said tubular guide extending from the second end of said glass fiber bundle and disposed in spaced relation to said light outlet member, said holder being fixed to the second part of said treatment chair so that the part of said tubular guide and said glass fiber bundle therein extending between said holder and said light outlet member is maintained in position relative to said second part even though said second part moves relative to said first part of said treatment chair.

2. Lamp assembly for dental-medical and similar purposes comprising a treatment chair having a first part and a second part movably displaceable relative to said first part, a light source mounted on said treatment chair remote from said second part, an elongated flexible glass fiber bundle having a first end and a second end with the first end connected to said light source for transmitting light through said glass fiber bundle, a flexible tubular guide enclosing said flexible glass fiber bundle for at least a portion of the length thereof between the first and second end of said glass fiber bundle, a light outlet member connected to the second end of said glass fiber bundle for directing the light therefrom, wherein the improvement comprises that said tubular guide encloses said glass fiber bundle from the second end thereof for a portion of the length of said glass fiber bundle, a holder mounted on said tubular guide enclosing and extending from the second end of said glass fiber bundle, said holder being disposed in spaced relation to the second end of said glass fiber bundle and being fixed to said second part of said treatment chair so that the part of said tubular guide and said glass fiber bundle extending between said holder and said light outlet member is maintained in position relative to said second part when said second part moves relative to said first part of said treatment chair.

3. Lamp assembly, as set forth in claim 2, wherein said glass fiber bundle is located within and is held in a stationary position within said first part of said treatment chair intermediate said light source and the location of said holder on said second part so that the part of said glass fiber bundle located within said first part of said treatment chair does not interfere with movement around said treatment chair.

4. Lamp assembly, as set forth in claim 2, wherein a control element is mounted on said light source and said control element is accessible on the exterior of said treatment chair.

5. Lamp assembly for use with a medical-dental or similar purpose treatment chair having one part thereof movable to another part, comprising a light source, an elongated flexible glass fiber bundle having a first end connected to said light source and a second end, a flexible tubular guide enclosing at least a portion of the length of said glass fiber bundle from the second end thereof toward the first end, a light source outlet attached to the second end of said glass fiber bundle, wherein the improvement comprises a holder attached to said tubular guide extending from the second end of said glass fiber bundle and said holder spaced from the second end of said glass fiber bundle, said holder arranged to be secured to the one part of the treatment chair movable to the other part so that the part of said tubular guide and said glass fiber bundle extending from said holder to said light source outlet remains stationary relative to the movable part of the treatment chair to which said holder is secured when the movable part moves relative to the other part.

* * * * *